US012609961B2

(12) United States Patent
Fleming et al.

(10) Patent No.: US 12,609,961 B2
(45) Date of Patent: Apr. 21, 2026

(54) TEXT-TO-TRAFFIC SYNTHETIC NETWORK TRAFFIC DATA GENERATION SYSTEM

(71) Applicant: Cisco Technology, Inc., San Jose, CA (US)

(72) Inventors: Charles Fleming, Oxford, MS (US); Myungjin Lee, Bellevue, WA (US); Gaowen Liu, Naperville, IL (US); Ramana Rao V.R. Kompella, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 18/821,107

(22) Filed: Aug. 30, 2024

(65) Prior Publication Data

US 2026/0067325 A1 Mar. 5, 2026

(51) Int. Cl.
*H04L 9/40* (2022.01)
*G06F 40/58* (2020.01)

(52) U.S. Cl.
CPC .......... *H04L 63/1441* (2013.01); *G06F 40/58* (2020.01)

(58) Field of Classification Search
CPC ............................ H04L 63/1441; G06F 40/58
See application file for complete search history.

(56) References Cited

U.S. PATENT DOCUMENTS

| | | | | |
|---|---|---|---|---|
| 2021/0160268 A1* | 5/2021 | Anderson | ........... | H04L 63/1458 |
| 2022/0086174 A1* | 3/2022 | Helmsen | ............. | H04L 63/1416 |

| | | | | |
|---|---|---|---|---|
| 2023/0377226 A1 | 11/2023 | Saharia et al. | | |
| 2025/0258723 A1* | 8/2025 | Liu | ...................... | G06N 3/0455 |
| 2025/0272713 A1* | 8/2025 | Hu | ..................... | G06Q 30/0246 |
| 2025/0291899 A1* | 9/2025 | Kassis | ..................... | G10L 17/18 |
| 2025/0292763 A1* | 9/2025 | Sharma | ................. | G06N 3/045 |
| 2025/0317739 A1* | 10/2025 | Amini | ................. | H04W 12/121 |

FOREIGN PATENT DOCUMENTS

| | | |
|---|---|---|
| CN | 116232656 A | 6/2023 |
| CN | 116484968 A | 7/2023 |
| WO | 2023135454 A1 | 7/2023 |

OTHER PUBLICATIONS

Deng G., et al., "PENTESTGPT: An LLM-empowered Automatic Penetration Testing Tool", arXiv:2308.06782v1 [cs.SE], Aug. 13, 2023, pp. 1-17.
Weng L., "What are Diffusion Models?", Lil'Log, Jul. 11, 2021, Retrieved from https://lilianweng.github.io/posts/2021-07-11-diffusion-models/ on Jul. 24, 2024, pp. 1-25.

* cited by examiner

*Primary Examiner* — Beemnet W Dada
(74) *Attorney, Agent, or Firm* — Merchant & Gould P.C.; Kenneth J. Heywood

(57) ABSTRACT

In one implementation, a device obtains a prompt from a user that describes a particular type of network traffic by specifying one or more constraints. The device converts the prompt into a latent space representation. The device generates, based on the latent space representation, synthetic network traffic data for the particular type of network traffic using a diffusion model. The device provides the synthetic network traffic data.

20 Claims, 7 Drawing Sheets

TEXT-TO-TRAFFIC SYNTHETIC NETWORK TRAFFIC DATA GENERATION SYSTEM

TECHNICAL FIELD

The present disclosure relates generally to computer networks and more particularly to a text-to-traffic synthetic network traffic data generation system.

BACKGROUND

Machine learning models are increasingly used in computer networks for a wide variety of uses including network monitoring, network control, and network security, among others. For instance, in the case of network security, a machine learning model may assess the traffic flows in the network to determine whether any of those flows represents a potential attack. This allows the network to proactively prevent attacks by taking corrective measures, such as blocking the attack traffic.

One challenge with respect to deploying machine learning in a computer network, though, relates to the collection of traffic samples that are used to train a given model. Indeed, computer networks are typically stable and rarely under attack. This means that finding examples of real-world network problems, attacks, configurations, etc. for purposes of model training can be difficult.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device obtains a prompt from a user that describes a particular type of network traffic by specifying one or more constraints. The device converts the prompt into a latent space representation. The device generates, based on the latent space representation, synthetic network traffic data for the particular type of network traffic using a diffusion model. The device provides the synthetic network traffic data.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
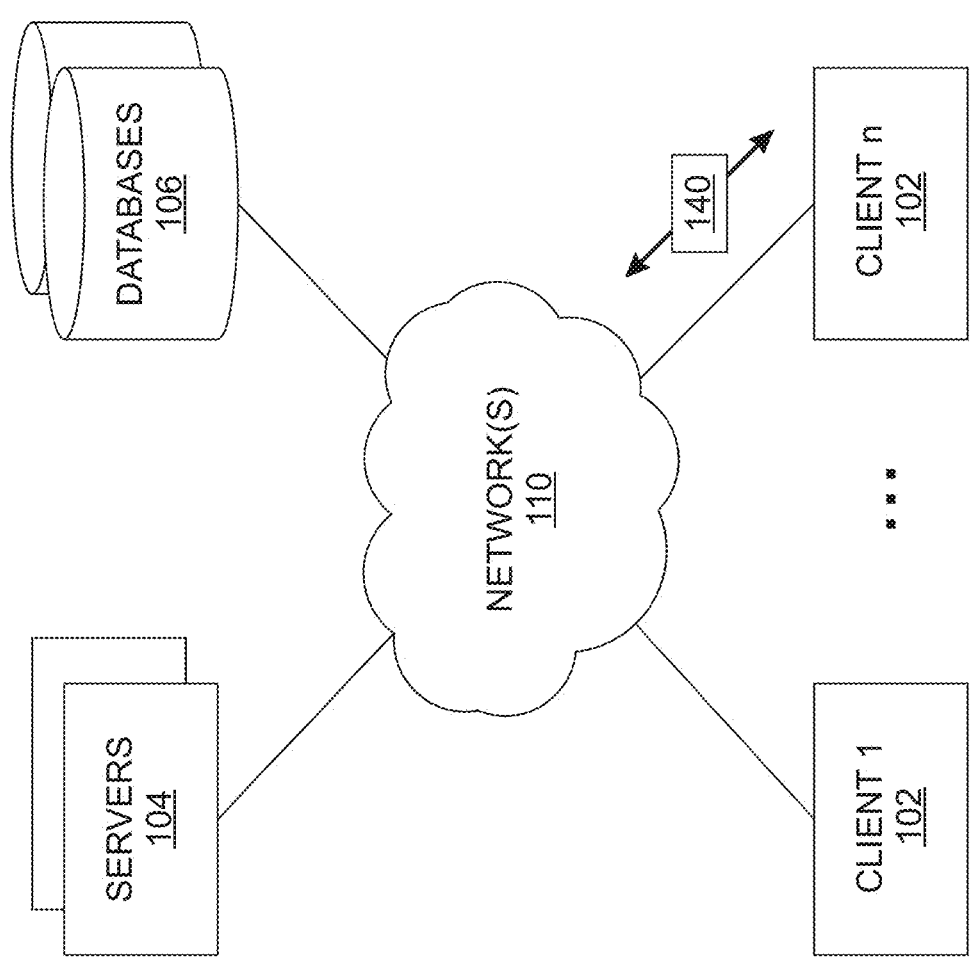
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
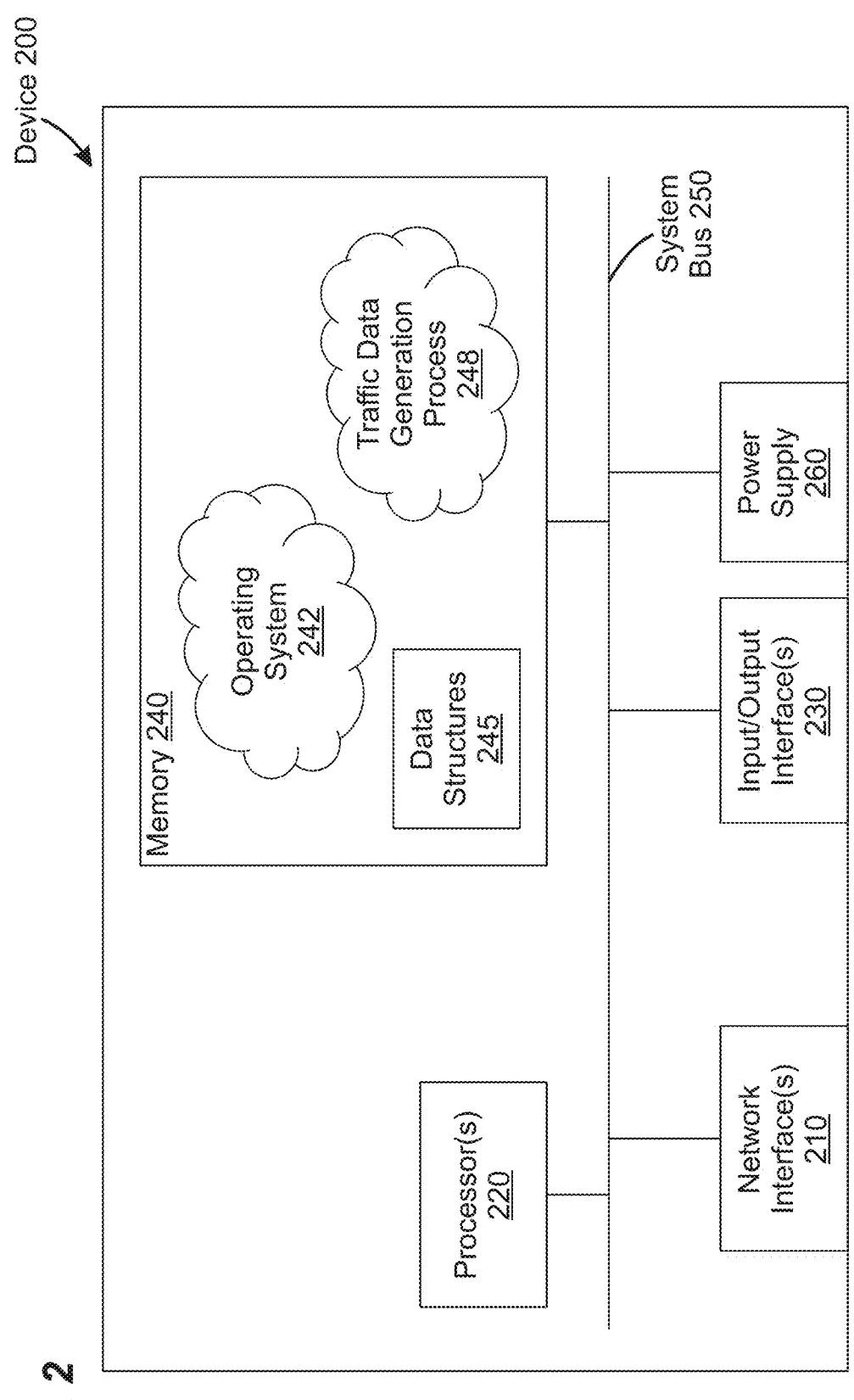
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a traffic data generation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, traffic data generation process 248 may include computer executable instructions that, when executed by processor 220, cause device 200 to perform the techniques described herein. To do so, in some implementations, traffic data generation process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, traffic data generation process 248 may employ and/or be utilized to handle prompts to and/or access of one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the traffic data generation process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, traffic data generation process 248 may also include, or otherwise use or be employed to operate with, one or more generative artificial intelligence/ machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of machine unlearning, traffic data generation process 248 may be a component of, use, and/or be utilized in the management of prompts/access to a generative model to perform layer attribution, perform layer sensitivity assessment, remove capabilities from a previously trained model, retain model performance, etc. based on a conversational input from a user (e.g., voice, text, etc.). Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

Figure 3:
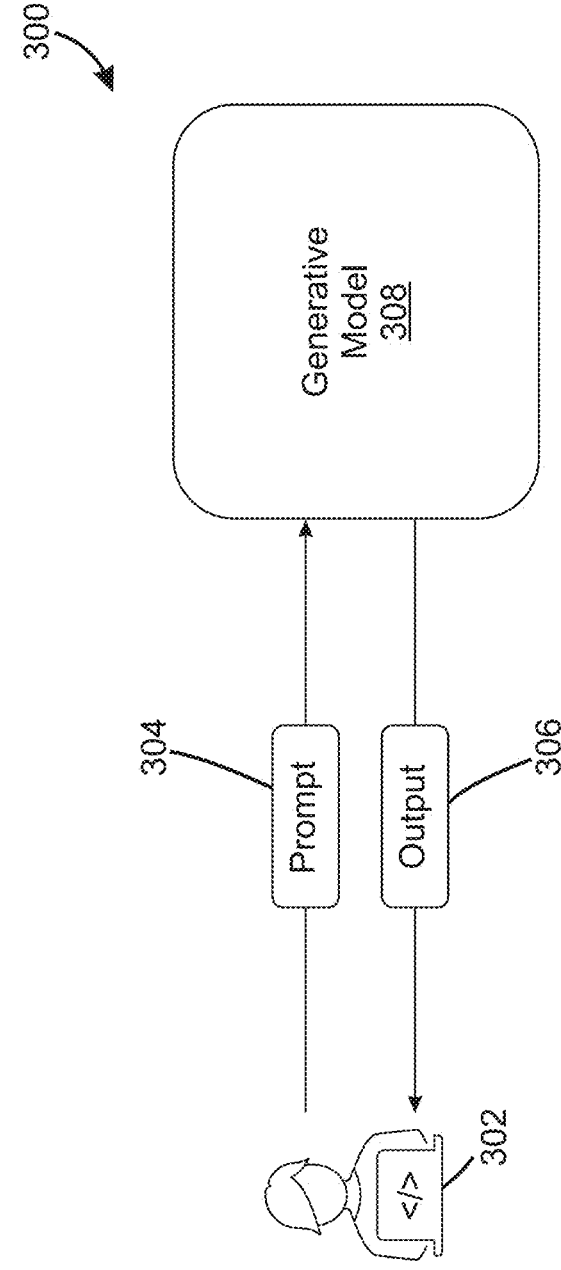
FIG. 3 illustrates an example of interfacing with a generative model.

FIG. 3 illustrates an example 300 for interfacing with a generative model, in various implementations. In example 300, a user 302 may send a prompt 304 (e.g., a query, a query augmented with additional data, documents, and/or images, etc.) to a generative model 308. The generative model 308 may be configured to process a prompt 304 to generate an output 306 to satisfy the prompt 304.

The generative model 308 may be a model configured to apply its trained algorithms to generate a response (e.g., output 306) based on the prompt 304 provided. For instance, in some cases, generative model 308 may take the form of a large language model (LLM), diffusion-based model, combinations thereof, or the like.

The output 306 may be the result produced by the generative model 308 (e.g., by the application of the generative model 308 to the prompt 304). This output can vary depending on the model's configuration and the task at hand. For example, the output 306 may include one or more of a generated and/or synthesized image, a text response, a classification and/or prediction, etc.

As noted above, obtaining examples of network conditions and configurations, such as a particular type of network attack, can be quite challenging. For instance, in the case of a network attack, there only a couple of public databases of example traffic associated with attacks and these examples are old and of low quality. Such information, though, is needed for purpose of training and testing network security systems (e.g., intrusion detection systems), particularly those that rely on a trained machine learning model to function.

Text-to-Traffic Synthetic Network Traffic Generation System

The techniques herein introduce an approach to generate synthetic network traffic data (i.e., traffic data not actually observed in a real-world network) that conforms to a specified set of one or more constraints. For instance, in the case of a network attack, the techniques herein are able to generate synthetic network traffic attack data according to the type of attack specified by the user and any other constraints they specify. Further aspects of the techniques herein provide for the user to interact with the system using text describing the one or more constraints.

Illustratively, the techniques described herein may be performed by hardware, software, and/or firmware, such as in accordance with traffic data generation process 248, which may include computer executable instructions executed by the processor 220 (or independent processor of interfaces 210) to perform functions relating to the techniques described herein.

Specifically, according to various implementations, a device obtains a prompt from a user that describes a particular type of network traffic by specifying one or more constraints. The device converts the prompt into a latent space representation. The device generates, based on the latent space representation, synthetic network traffic data for the particular type of network traffic using a diffusion model. The device provides the synthetic network traffic data.

Figure 4:
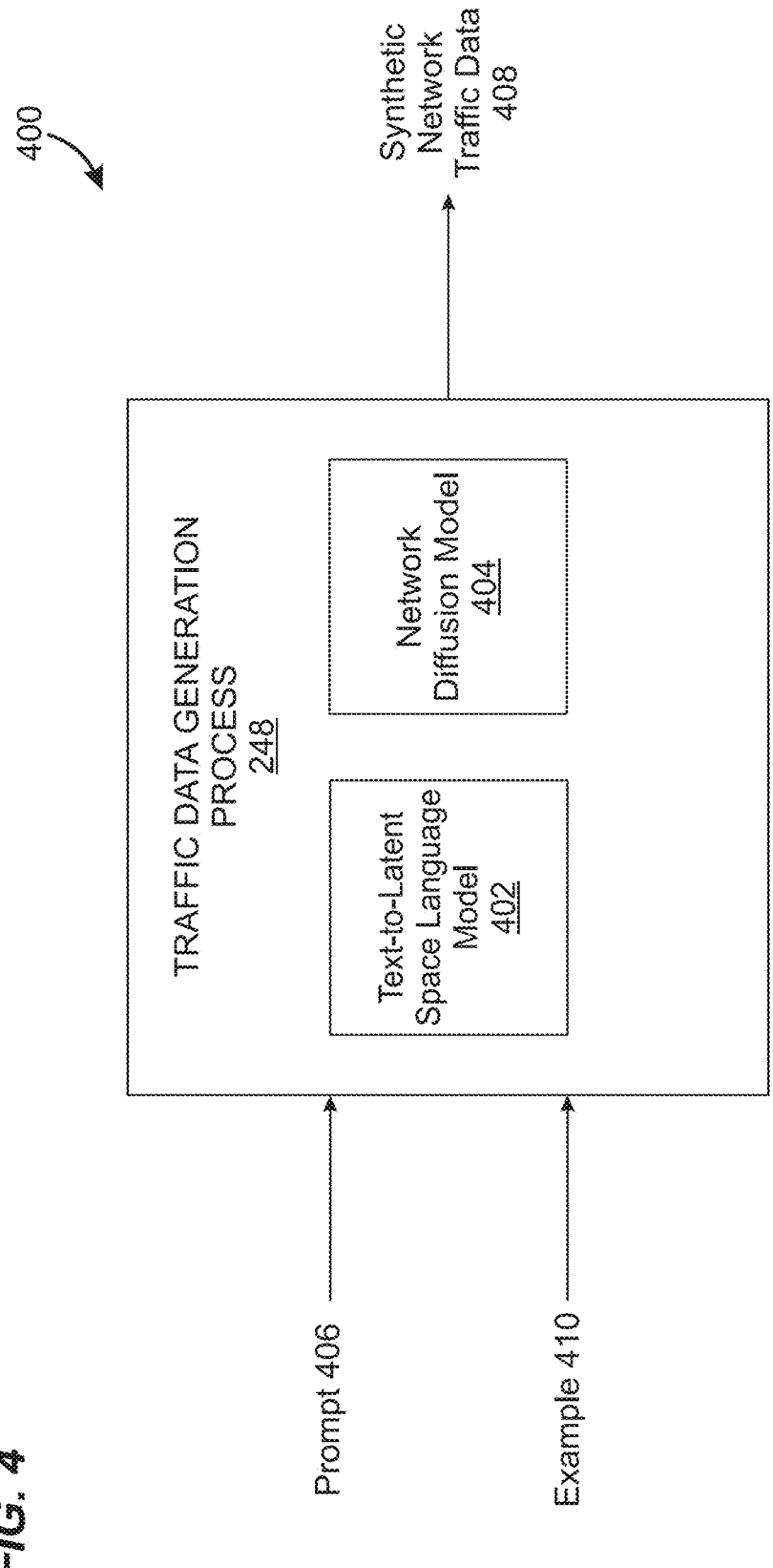
FIG. 4 illustrates an example architecture for text-to-traffic synthetic network traffic data generation.

Operationally, FIG. 4 illustrates an example architecture 400 for text-to-traffic synthetic network traffic data generation, in various implementations. At the core of architecture 400 is traffic data generation process 248, which may be executed by a controller for a network, a networking device, or another device in communication therewith. For instance, traffic data generation process 248 may be executed by a server, a particular networking device in the network (e.g., a router, etc.), another device or service in communication therewith, or any other device in a network.

As shown, traffic data generation process 248 may include any or all of the following components: a text-to-latent space language model 402 and/or a network diffusion model 404. As would be appreciated, the functionalities of these components may be combined or omitted, as desired. In addition, these components may be implemented on a singular device or in a distributed manner, in which case the combination of executing devices can be viewed as their own singular device for purposes of executing traffic data generation process 248.

During execution, text-to-latent space language model 402 may be configured to convert a prompt 406, which is typically a textual prompt specified by a user, into a latent space representation. To do so, text-to-latent space language model 402 may take the form of an encoder model that convers the words/tokens of an input prompt, such as prompt 406, into a multi-dimensional space that represents them as numerical vectors. Suitable models that text-to-latent space language model 402 could use include, but are not limited to, Word2Vec, other encoders, and the like.

In various implementations, network diffusion model 404 may be a diffusion model configured to take as input a latent space representation describing a particular type of network traffic and generating synthetic network traffic data 408, accordingly. As would be appreciated, a diffusion model is a specific type of generative model that functions by gradually adding noise and then reversing it. This differs from other forms of generative models, such as generative adversarial networks (GANs), which rely on a discriminator and a generator operating in an adversarial manner.

Typically, prompt 406 may take the form of a text-based input from a user. However, in another implementation, the actual input from the user may take the form of audio/voice data, in which case a voice-to-text mechanism may convert that input into prompt 406. In a further implementation, prompt 406 may even be multimodal, such as by including both image and text data (e.g., an image of a network and text describing the desired type of traffic). In such a case, text-to-latent space language model 402 may be configured to convert the multimodal prompt into a latent space embedding for network diffusion model 404. In an additional implementation, prompt 406 may instead be generated by a conversational agent, rather than a user.

In general, prompt 406 may include one or more constraints that specify the type of network traffic desired by the user. For instance, the one or more constraints may include any or all of the following:

The type of network condition experienced by the traffic such as:
    a network attack—e.g., of which the desired network traffic is a part or, alternatively which could affect the desired network traffic normal operations
    a failure—e.g., a path failure, a node failure, etc.
    a traffic profile
    etc.

The specifics for the desired traffic such as:
    its source
    its destination
    its protocol(s)
    its traffic class(es)
    timing information
    etc.

Any other constraints specified by prompt 406

Synthetic network traffic data 408 may also take a variety of forms, depending on its intended use. In one implementation, synthetic network traffic data 408 may simulate network telemetry (e.g., Netflow or IPFIX records, etc.), had the specified type of network traffic been observed in the network. Such information could be included in a training or testing dataset for a machine learning model. For instance, in the case of the machine learning model taking the form of a network attack detector, synthetic network traffic data 408 could be used to either train the network attack detector to detect a certain type of attack or test the ability of an already trained detector to identify that type of attack.

In another implementation, though, synthetic network traffic data 408 could itself take the form of a configuration for one or more nodes in the network to cause them to generate the desired type of traffic. Indeed, many enterprise networks now include endpoint agents and other agents distributed throughout the network for purposes of path tracing and path probing (e.g., to assess the performance of a path). Accordingly, synthetic network traffic data 408 may take the form of a configuration for such an agent, thereby causing it to generate the desired type of traffic, so that telemetry can be collected for the traffic.

Traffic data generation process 248 may also provide a response/output back to the user regarding synthetic network traffic data 408, allowing the user to review the results of the generation.

As detailed further below, another potential mode of operation of traffic data generation process 248 is an example-based approach whereby the user or other calling entity provides an example 410 of the constraint(s) associated with prompt 406. This can be useful as it affords network diffusion model 404 a starting point when generating synthetic network traffic data 408. For instance, example 410 may provide an example of a particular type of network attack and prompt 406 may request synthetic network traffic data 408 for a particular type of traffic associated with that type of network attack.

Figure 5A:
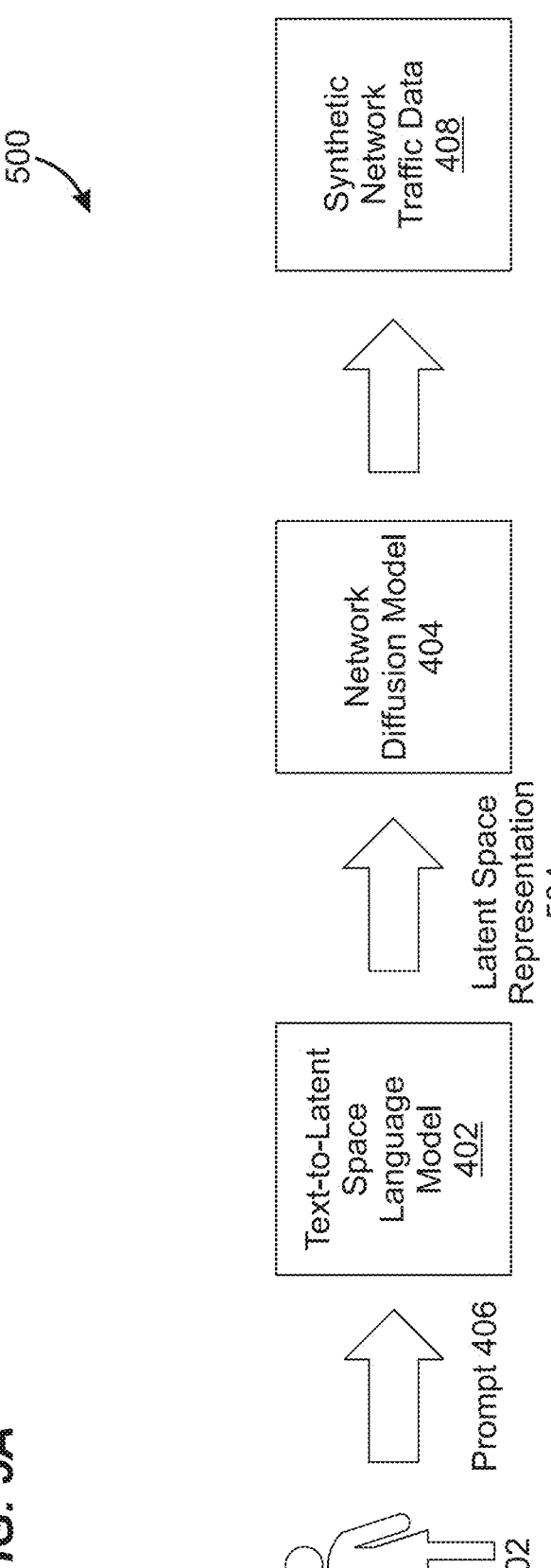
FIGS. 5A-5B illustrate examples of the use of architecture in FIG. 4 to generate synthetic network traffic data.
Figure 5B:
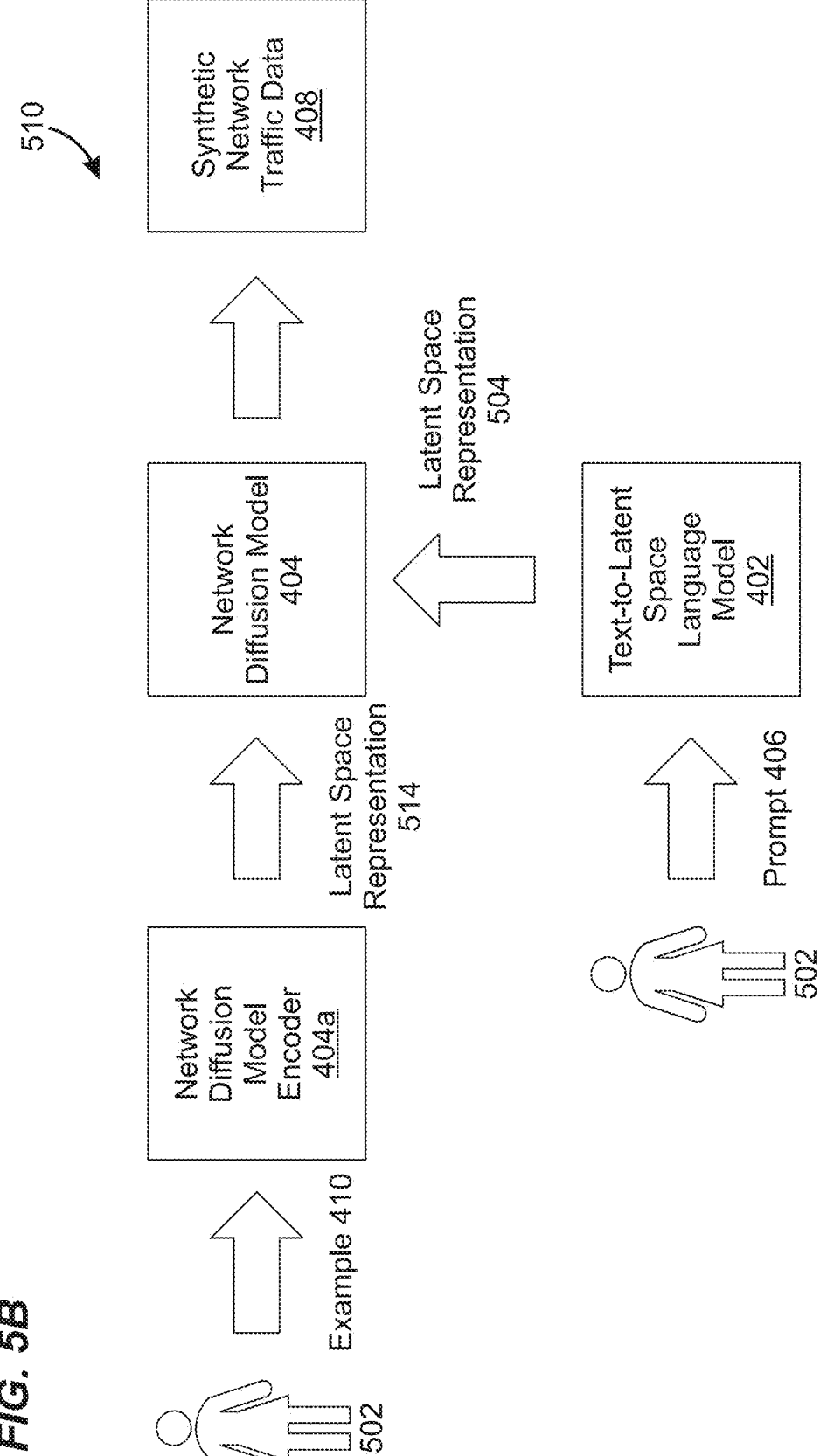

FIGS. 5A-5B illustrate examples of the use of architecture 400 in FIG. 4 to generate synthetic network traffic data, in various implementations. FIG. 5A illustrates an example 500 of a first approach to generating synthetic network traffic data from a textual prompt. Here, the general idea is to leverage network diffusion model 404, which has been trained to generate network data, and pair this with text-to-latent space language model 402 that is specialized on network terminology and able to convert a prompt into a latent space representation that network diffusion model 404 can understand.

Thus, during operation, a user 502 may issue a prompt describing their desired type of traffic. In turn, text-to-latent space language model 402 may generate a latent space representation 504 of the prompt. In turn, a decoder of network diffusion model 404 may convert latent space representation 504 into synthetic network traffic data 408. An alternative mode of operation is shown in example 510 in FIG. 5B, which illustrates the example-based generation approach. Here, user 502 may provide example 410 to the system, which then uses the encoder 404a of network diffusion model 404 to form a latent space representation 514 of the example. For instance, in the case of a network attack, latent space representation 514 may be representation of that type of attack in the latent space of network diffusion model 404. As noted, this gives network diffusion model 404 a starting point from which it may generate synthetic network traffic data 408.

In turn, user 502 (or another user) may input prompt 406 requesting that the system generate synthetic network traffic data 408 for its specified type of traffic. For instance, assume that example 410 is an example of a specific type of network attack. In such a case, prompt 406 may request synthetic network traffic data 408 that corresponds to network traffic when that type of attack is underway in the network.

Similar to example 500, text-to-latent space language model 402 then converts prompt 406 in example 510 into latent space representation 504. In turn, network diffusion model 404 then begins the process of generating synthetic network traffic data 408 starting with latent space representation 514. Here, network diffusion model 404 may make small modifications in the latent space by adding noise, then use the prompt 406 at different iterations of the decoding process to modify the result to match the requirements.

Figure 6:
FIG. 6 illustrates an example of a simplified procedure for synthetic network traffic data generation, in accordance with one or more implementations described herein.
Figure 6:
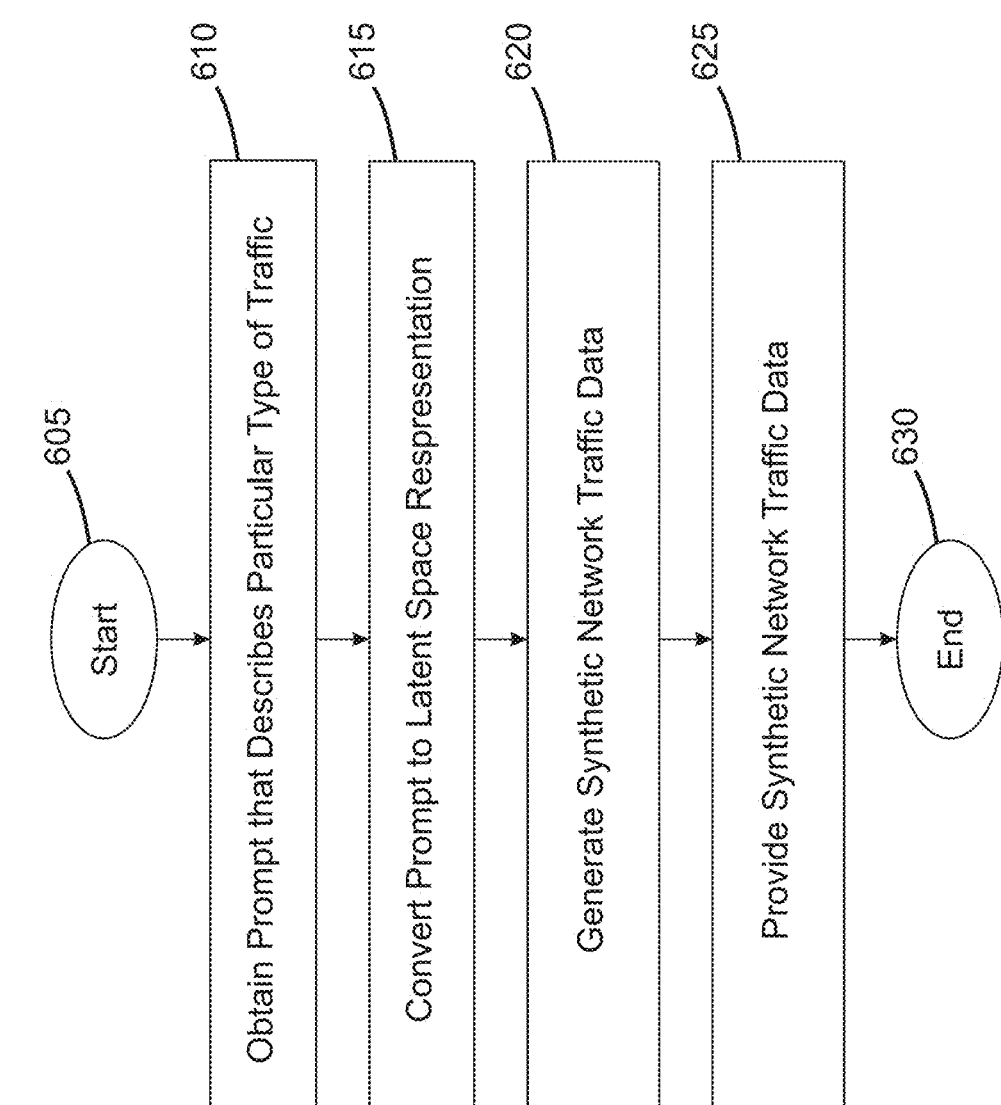

FIG. 6 illustrates an example of a simplified procedure for synthetic network traffic data generation, in accordance with one or more implementations described herein. For example, a non-generic, specifically configured device (e.g., device 200), may perform procedure 600 (e.g., a method) by executing stored instructions (e.g., traffic data generation process 248). The procedure 600 may start at step 605, and continues to step 610, where, as described in greater detail above, the device (e.g., a controller, server, etc.) may obtain a prompt from a user that describes a particular type of network traffic by specifying one or more constraints. In some implementations, the particular type of network traffic is associated with a specific type of network attack. In one implementation, the prompt is a textual prompt. In another implementation, the prompt is a multimodal prompt.

At step 615, as detailed above, the device may convert the prompt into a latent space representation. In some implementations, the device may also encode an example of a type of network condition in a latent space of a diffusion model, whereby the one or more constraints specifies the type of network condition.

At step 620, the device may generate, and based on the latent space representation, synthetic network traffic data for the particular type of network traffic using a diffusion model, as described in greater detail above. In various implementations, the device uses a text-to-latent space language model to convert the prompt into the latent space representation. In one implementation, the synthetic network traffic data comprises a configuration for a node in a network to generate traffic in the network of the particular type.

At step 625, as detailed above, the device may provide the synthetic network traffic data. In one implementation, this may entail including the synthetic network traffic data in training data for a machine learning model. In another implementation, this may entail including the synthetic network traffic data in testing data for a machine learning model. In a further implementation, the device may also provide a response to the user regarding the synthetic network traffic data.

Procedure 600 may then end at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce a text-to-traffic synthetic network traffic generation system able to generate synthetic network traffic for a variety of specified scenarios. Doing so allows for the generation of synthetic network traffic data that can be used for various purposes such as training a machine learning model to recognize the specified scenario in a computer network.

While there have been shown and described illustrative implementations that provide for text-to-traffic synthetic network traffic generation system, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:
   obtaining, by a device, a prompt from a user that describes a particular type of network traffic by specifying one or more constraints;
   converting, by the device, the prompt into a latent space representation;
   generating, by the device and based on the latent space representation, synthetic network traffic data for the particular type of network traffic using a diffusion model; and
   providing, by the device, the synthetic network traffic data.

2. The method as in claim 1, wherein providing the synthetic network traffic data comprises:
   including the synthetic network traffic data in training data for a machine learning model.

3. The method as in claim 1, wherein providing the synthetic network traffic data comprises:
   including the synthetic network traffic data in testing data for a machine learning model.

4. The method as in claim 1, wherein the synthetic network traffic data comprises a configuration for a node in a network to generate traffic in the network of the particular type.

5. The method as in claim 1, wherein the particular type of network traffic is associated with a specific type of network attack.

6. The method as in claim 1, further comprising:
   encoding an example of a type of network condition in a latent space of the diffusion model, wherein the one or more constraints specifies the type of network condition.

7. The method as in claim 1, wherein the device uses a text-to-latent space language model to convert the prompt into the latent space representation.

8. The method as in claim 1, wherein the prompt is a textual prompt.

9. The method as in claim 1, wherein the prompt is a multimodal prompt.

10. The method as in claim 1, further comprising:
    providing a response to the user regarding the synthetic network traffic data.

11. An apparatus, comprising:
    one or more network interfaces;
    a processor coupled to the one or more network interfaces and configured to execute one or more processes; and
    a memory configured to store a process that is executable by the processor, the process when executed configured to:
       obtain a prompt from a user that describes a particular type of network traffic by specifying one or more constraints;
       convert the prompt into a latent space representation;
       generate, and based on the latent space representation, synthetic network traffic data for the particular type of network traffic using a diffusion model; and
       provide the synthetic network traffic data.

12. The apparatus as in claim 11, wherein the apparatus provides the synthetic network traffic data by:
    including the synthetic network traffic data in training data for a machine learning model.

13. The apparatus as in claim 11, wherein the apparatus provides the synthetic network traffic data by:

including the synthetic network traffic data in testing data for a machine learning model.

14. The apparatus as in claim 11, wherein the synthetic network traffic data comprises a configuration for a node in a network to generate traffic in the network of the particular type.

15. The apparatus as in claim 11, wherein the particular type of network traffic is associated with a specific type of network attack.

16. The apparatus as in claim 11, wherein the process when executed is further configured to:

encode an example of a type of network condition in a latent space of the diffusion model, wherein the one or more constraints specifies the type of network condition.

17. The apparatus as in claim 11, wherein the apparatus uses a text-to-latent space language model to convert the prompt into the latent space representation.

18. The apparatus as in claim 11, wherein the prompt is a textual prompt.

19. The apparatus as in claim 11, wherein the prompt is a multimodal prompt.

20. A tangible, non-transitory, computer-readable medium storing program instructions that cause a device to execute a process comprising:

obtaining, by the device, a prompt from a user that describes a particular type of network traffic by specifying one or more constraints;

converting, by the device, the prompt into a latent space representation;

generating, by the device and based on the latent space representation, synthetic network traffic data for the particular type of network traffic using a diffusion model; and providing, by the device, the synthetic network traffic data.

\* \* \* \* \*